(12) United States Patent
Hong

(10) Patent No.: US 7,777,360 B2
(45) Date of Patent: Aug. 17, 2010

(54) WINDMILL-TYPE ELECTRIC GENERATION SYSTEM

(76) Inventor: Gu Duck Hong, 62-3, Maji-ri, Jeokseong-myeon, Paju-si, Gyeonggi-do 413-913 (KR)

( * ) Notice: Subject to any disclaimer, the term of this patent is extended or adjusted under 35 U.S.C. 154(b) by 662 days.

(21) Appl. No.: 11/722,087

(22) Filed: Jun. 18, 2007

(65) Prior Publication Data

US 2010/0090468 A1    Apr. 15, 2010

Related U.S. Application Data

(63) Continuation of application No. PCT/KR2006/000999, filed on Mar. 20, 2006.

(30) Foreign Application Priority Data

Mar. 23, 2005    (KR) .................. 10-2005-0023968

(51) Int. Cl.
*F03D 1/02* (2006.01)
*F03D 9/00* (2006.01)

(52) U.S. Cl. .......................... 290/55; 290/44
(58) Field of Classification Search .................. 290/44, 290/55
See application file for complete search history.

(56) References Cited

U.S. PATENT DOCUMENTS

| | | | | |
|---|---|---|---|---|
| 1,489,817 A | * | 4/1924 | Campbell | 416/128 |
| 2,153,523 A | * | 4/1939 | Roberts et al. | 290/55 |
| 2,177,801 A | * | 10/1939 | Erren | 290/55 |
| 3,032,119 A | * | 5/1962 | Hachmann | 416/200 R |
| 4,039,848 A | * | 8/1977 | Winderl | 290/55 |
| 6,476,513 B1 | * | 11/2002 | Gueorguiev | 290/55 |
| 7,384,239 B2 | * | 6/2008 | Wacinski | 416/128 |
| 7,582,981 B1 | * | 9/2009 | Meller | 290/44 |

FOREIGN PATENT DOCUMENTS

| | | | |
|---|---|---|---|
| DE | 3844505 A1 | * | 7/1990 |
| DE | 195 43 458 A1 | | 5/1997 |
| JP | 2002339852 A | * | 11/2002 |
| JP | 03-065204 A | | 3/2003 |
| KR | 10-2003-0073414 A | | 9/2003 |
| SU | 1612107 A | * | 12/1990 |
| WO | WO 9618815 A1 | * | 6/1996 |
| WO | 01-55590 A1 | | 8/2001 |

OTHER PUBLICATIONS

PCT International Preliminay Report, Philippe Becamel, Sep. 25, 2007.*

* cited by examiner

*Primary Examiner*—Joseph Waks
(74) *Attorney, Agent, or Firm*—Park & Associates IP Law LLC

(57) ABSTRACT

A windmill-type electric generation system including four rotary blade units (10, 12, 14, 16) mounted on opposite ends of corresponding rotary shafts in pairs, a first power transmission mechanism for transmitting the rotating movement of the blade units (12, 14) to an armature (110) of an electric generator (100), a second power transmission mechanism for transmitting the rotating movement of the blade units (10, 16) to a magnetic pole (120) of the electric generator (100), and the electric generator (100) for generating electricity through the rotation of the armature (110) and the magnetic pole (120) in the opposite directions, which is accomplished by the rotating movement of the blade units (10, 12, 14, 16) transmitted to the armature (110) and the magnetic pole (120) by the power transmission mechanisms.

4 Claims, 3 Drawing Sheets

US 7,777,360 B2

WINDMILL-TYPE ELECTRIC GENERATION SYSTEM

REFERENCE TO RELATED APPLICATIONS

This is a continuation of pending International Patent Application PCT/KR2006/000999 filed on Mar. 20, 2006, which designates the United States and claims priority of Korean Patent Application No. 10-2005-0023968 filed on Mar. 23, 2005.

FIELD OF THE INVENTION

The present invention relates to a windmill-type electric generation system, and, more particularly, to a windmill-type electric generation system wherein four rotary blade units having different lengths are provided to generate a large rotating force even from a small amount of wind, and a magnetic pole and an armature of an electric generator are rotated in opposite directions.

BACKGROUND OF THE INVENTION

Various wind power generation systems, i.e., windmill-type electric generation systems have been proposed. One of the conventional windmill-type electric generation systems is described in the specification of Korean Patent Application No. 2000-76789, which is related to the present invention.

This conventional windmill-type electric generation system includes rotary shafts coaxially mounted through a housing, first and second rotary blade units mounted to the corresponding rotary shafts in front of the housing such that the first and second rotary blade units can be rotated in opposite directions, and first and second electric generators for generating electricity by using the rotating force of the first and second rotary blade units. The conventional windmill-type electric generation system with the above-stated construction has advantages in that the two rotary blade units, i.e., the first and second rotary blade units, are mounted for a single housing, and the amount of electricity generated is doubled by using the two electric generators. However, the conventional windmill-type electric generation system has drawbacks in that the costs necessary for installing the windmill-type electric generation system are increased due to the provision of the plurality of electric generators, and it is difficult to maintain the windmill-type electric generation system.

Another windmill-type electric generation system is described in the specification of Korean Patent Application No, 2002-12965, which was filed in Korean Intellectual Property Office on May 11, 2002. This conventional windmill-type electric generation system is characterized in that rotating forces of two blade units are transmitted to a magnetic pole and an armature of an electric generator in opposite directions, whereby the electricity generation efficiency is doubled while the windmill-type electric generation system is easily and conveniently maintained. In case of every windmill-type electric generation system, it is required that the windmill, i.e., the rotary blade units, faces toward the blowing direction of wind. To this end, a rudder is further included in the conventional construction as in the conventional windmill-type electric generation system described in the specification of the above-mentioned patent application. In this case, however, it is difficult to adjust the directions of the rotary blade units such that the rotary blade units face toward the blowing direction of wind. Furthermore, the rotating force is not generated by the two rotary blade units when the wind blows gently

SUMMARY OF THE INVENTION

Therefore, the present invention has been made in view of the above problems, and it is an object of the present invention to provide a windmill-type electric generation system wherein four rotary blade units having different lengths are mounted in the order of length to easily generate an initial rotation even from a light wind, and the four rotary blade units are rotated in opposite directions to transmit rotating forces of the four rotary blade units to a magnetic pole and an armature of an electric generator in opposite directions, thereby maximizing the electricity generation efficiency.

In accordance with the present invention, the above and other objects can be accomplished by the provision of a windmill-type electric generation system that generates electricity by using the rotating movement of rotary blade units mounted on opposite ends of corresponding rotary shafts, which are mounted through a housing disposed at the upper end of a supporting post, such that the rotary blade units can be rotated in the blowing direction of wind, wherein the windmill-type electric generation system comprises: a first rotary blade unit mounted to the front end of the corresponding rotary shaft at one side of the housing, the first rotary blade unit having the smallest length; a second rotary blade unit mounted on the corresponding rotary shaft such that the second rotary blade unit can be rotated in the direction opposite to the rotating direction of the first rotary blade unit, the second rotary blade unit being disposed at the rear of the first rotary blade unit while being spaced a predetermined distance from the first rotary blade unit, the second rotary blade unit having a length greater than that of the first rotary blade unit; a third rotary blade unit mounted on the corresponding rotary shaft at the other side of the housing such that the third rotary blade unit can be rotated in the same rotating direction as that of the second rotary blade unit, the third rotary blade unit having a length greater than that of the second rotary blade unit; a fourth rotary blade unit mounted on the corresponding rotary shaft such that the fourth rotary blade unit can be rotated in the direction opposite to the rotating direction of the third rotary blade unit, the fourth rotary blade unit being disposed at the rear of the third rotary blade unit while being spaced a predetermined distance from the third rotary blade unit, the fourth rotary blade unit having a length greater than that of the third rotary blade unit; a first power transmission mechanism for transmitting the rotating movement of the second and third rotary blade units to an armature of an electric generator; a second power transmission mechanism for transmitting the rotating movement of the first and fourth rotary blade units to a magnetic pole of the electric generator; and the electric generator for generating electricity through the rotation of the armature and the magnetic pole in the opposite directions, which is accomplished by the rotating movement of the first to fourth rotary blade units transmitted to the armature and the magnetic pole by the first and second power transmission mechanisms.

Preferably, the ratio of lengths of the first to fourth rotary blade units is 1:1.2:3.8:4.

Preferably, the first power transmission mechanism includes: a first idle gear mounted to the inner wall of the supporting post such that the first idle gear can be rotated by a bearing; a gear mounted to a rotary shaft of the second rotary blade unit such that the gear can be rotated along with the rotary shaft of the second rotary blade unit, the gear being engaged with the first idle gear; a gear mounted to a rotary shaft of the third rotary blade unit such that the gear can be rotated along with the rotary shaft of the third rotary blade unit, the gear being engaged with the first idle gear at the side opposite to the gear; a driven gear engaged with the first idle gear under the first idle gear such that the driven gear can be rotated along with the first idle gear; and a rotary shaft mounted to the center of the driven gear for transmitting the rotating movement of the driven gear to the armature of the electric generator, and the second power transmission mechanism includes: a second idle gear mounted to a supporting shaft such that the second idle gear can be rotated by a bearing, the second idle gear being disposed coaxially with the first idle gear; a gear mounted to a rotary shaft of the first and fourth rotary blade units such that the gear can be rotated along with the rotary shaft of the first and fourth rotary blade units, the gear being engaged with the second idle gear; a driven gear engaged with the second idle gear under the second idle gear such that the driven gear can be rotated along with the second idle gear; and a rotary shaft mounted to the center of the driven gear for transmitting the rotating movement of the driven gear to the magnetic pole of the electric generator, whereby the armature and the magnetic pole of the electric generator are rotated in opposite directions by the first and second power transmission mechanisms.

According to the present invention with the above-stated construction, the windmill-type electric generation system includes a total of four rotary blade units mounted on the rotary shafts in pairs, i.e., two rotary blade units mounted on the corresponding rotary shafts at each side of the supporting post. Consequently, the length and weight of each rotary blade unit are reduced as compared to the conventional art, and therefore, it is easy and convenient to transport the rotary blade units to steep and arduous regions and to install them at the steep and arduous regions. Furthermore, the rotary blade units are disposed at both sides of the supporting post, and therefore, problems caused due to eccentricity can be considerably eliminated.

In addition, the armature and the magnetic pole can be rotated in opposite directions, thereby doubling the number of rotations, and therefore, maximizing the electricity generation efficiency.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of the present invention will be described in detail with reference to the accompanying drawings.

Figure 1:
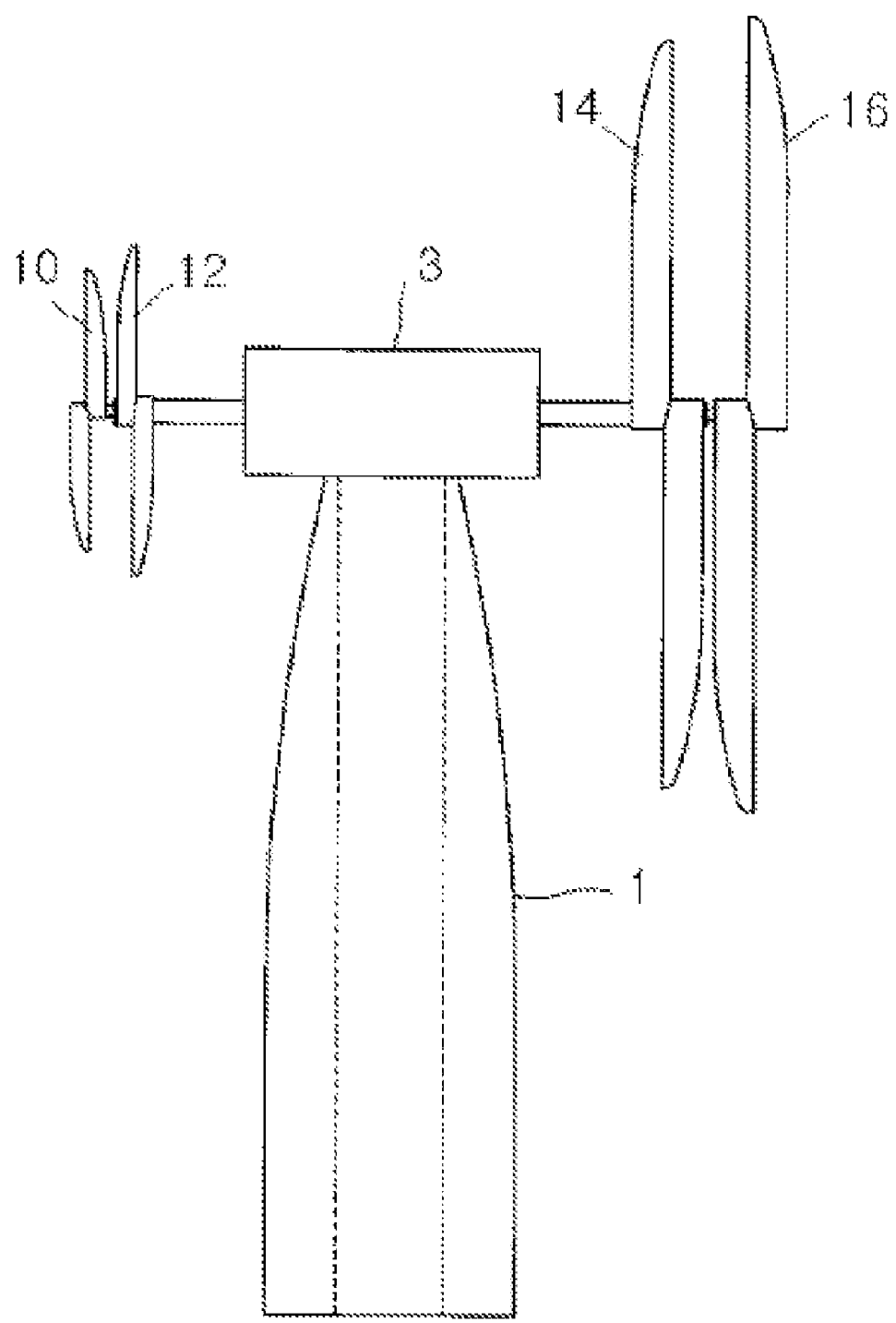
FIG. 1 is a schematic view illustrating a windmill-type electric power generation system according to the present invention.

FIG. 1 is a schematic view illustrating a windmill-type electric power generation system according to the present invention.

Referring to FIG. 1, a housing 3 is mounted at the upper end of a supporting post, and rotary shafts, on which a plurality of rotary blade units are securely mounted, and power transmission mechanisms are mounted in the housing 3 such that the rotary blade units can be rotated in the blowing direction of wind. As shown in FIG. 1, the windmill-type electric power generation system according to the present invention includes two front rotary blade units 10 and 12, which are disposed in front of the housing 3, and two rear rotary blade units 14 and 16, which are disposed in the rear of the housing 3. These four rotary blade units 10, 12, 14, and 16 have different lengths. Specifically, the length of the second rotary blade unit 12, which is disposed at the rear of the first rotary blade unit 10, is greater than that of the first rotary blade unit 10, the length of the third rotary blade unit 14, which is disposed in front of the fourth rotary blade unit 16, is greater than that of the second rotary blade unit 12, and the length of the fourth rotary blade unit 16 is greater than that of the third rotary blade unit 14, which will be described hereinafter in more detail.

As the four rotary blade units 10, 12, 14, and 16 having different lengths are successively mounted on the rotary shafts in the order of length as described above, the four rotary blade units 10, 12, 14, and 16 are successively arranged from the shortest rotary blade unit having low resistance to wind to the longest rotary blade unit having high resistance to wind. When the rotary blade units 10, 12, 14, and 16 are arranged as described above, the first rotary blade unit 10 having low resistance to wind is rotated even by a light wind, whereby the rotation of the other rotary blade units 12, 14, and 16 having high resistance to wind, which are disposed at the rear of the first rotary blade unit 10, is facilitated.

Generally, a windmill-type electric power generation system is installed on islands or in mountainous regions, where a large amount of wind blows. In addition, it is necessary that the length of the rotary blade unit be increased to obtain a high ratio of rotating force to wind force. However, the islands or the mountainous regions, where the windmill-type electric power generation system is installed, are difficult to access. As a result, it is very difficult to transport large-sized rotary blade units to the islands or the mountainous regions, and therefore, it will cost a great deal to transport and install the large-sized rotary blade unit. Consequently, it is preferable to obtain the same rotating force using a rotary blade unit having reduced length because the small-sized rotary blade unit is easy to transport and install. In order to solve the above-mentioned problem, the four small-sized rotary blade units are used according to the present invention. In addition, when the large-sized rotary blade unit, which is very heavy, is mounted at one side of the housing as in the conventional art, it is necessary to further reinforce the supporting post such that the weight of the large-sized rotary blade unit can be appropriately supported by the supporting post. Also, eccentric load is applied to the supporting post. According to the present invention, the rotary blade units are disposed at opposite sides of the housing, by which the eccentric load problem is somewhat solved.

According to the present invention, the four rotary blade units are mounted on the rotary shafts such that the first rotary blade unit 10 and the fourth rotary blade unit 16 can be rotated in the same direction, and the second rotary blade unit 12 and the third rotary blade unit 14 can be rotated in the direction opposite to the rotating direction of the first rotary blade unit 10 and the fourth rotary blade unit 16. Specifically, when the first rotary blade unit 10 and the fourth rotary blade unit 16 are rotated in the clockwise direction, the second and third rotary blade units 12 and 14 are rotated in the counterclockwise direction. The opposite rotating directions of the rotary blade units can be easily set by arranging the blade units such that the angles of blades constituting the respective blade units are opposite to each other, a detailed description of which will not be given. To this end, it is preferable that the first rotary blade unit 10 and the fourth rotary blade unit 16 be mounted on the same rotary shaft if possible. Also, the rotary shaft for the first and fourth rotary blade units 10 and 16 is arranged coaxially with the rotary shaft for the second and third rotary blade units 12 and 14.

The third and fourth rotary blade units 14 and 16 serve as a rudder of the conventional windmill in addition to the generation of rotating force. Specifically, the windmill directly faces toward the blowing direction of wind by the provision of the third and fourth rotary blade units 14 and 16.

Meanwhile, it is preferable to maintain the distance between the first rotary blade unit 10 and the second rotary blade unit 12 and the distance between the third rotary blade unit 14 and the fourth rotary blade unit 16 such that eddies generated at the rear rotary blade units by the front rotary blade units assist the rear rotary blade units to be rotated. Specifically, the eddy generated by the first rotary blade unit 10 assists the second rotary blade unit 12 to be rotated in the direction opposite to the rotating direction of the first rotary blade unit 10, and therefore, the rotating force of the second rotary blade unit 12, which is rotated in the direction opposite to the rotating direction of the first rotary blade unit 10, is increased. The effect of the eddy is also applied between the third rotary blade unit 14 and the fourth rotary blade unit 16 in the same manner.

Figure 2:
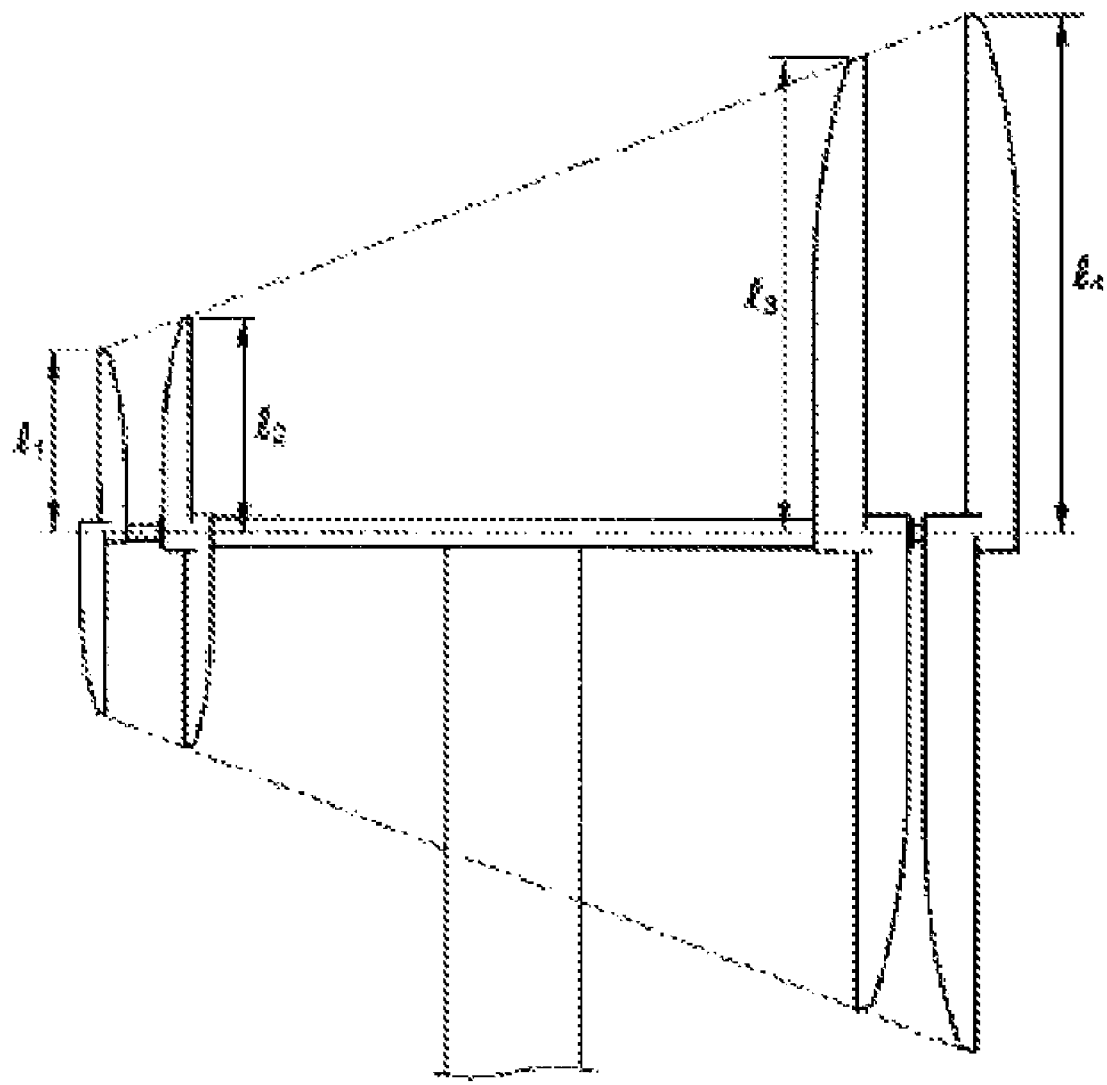
FIG. 2 is a schematic view illustrating length relations of rotary blade units of the windmill-type electric power generation system according to the present invention.

FIG. 2 is a schematic view illustrating length relations of the rotary blade units of the windmill-type electric power generation system according to the present invention.

Referring to FIG. 2, it is assumed that the lengths of the first to fourth rotary blade units 10, 12, 14, and 16 from the corresponding rotary shafts are $l_1, l_2, l_3,$ and $l_4$, respectively. A large number of experiments carried out by the inventor of the present invention reveal that it is the most preferable when $l_1:l_2:l_3:l_4=1:1.2:3.8:0.4$. When the length ratio is set as specified above, it has been found that the eddies generated by the front rotary blade units optimally affect the rotation of the rear rotary blade units.

Figure 3:
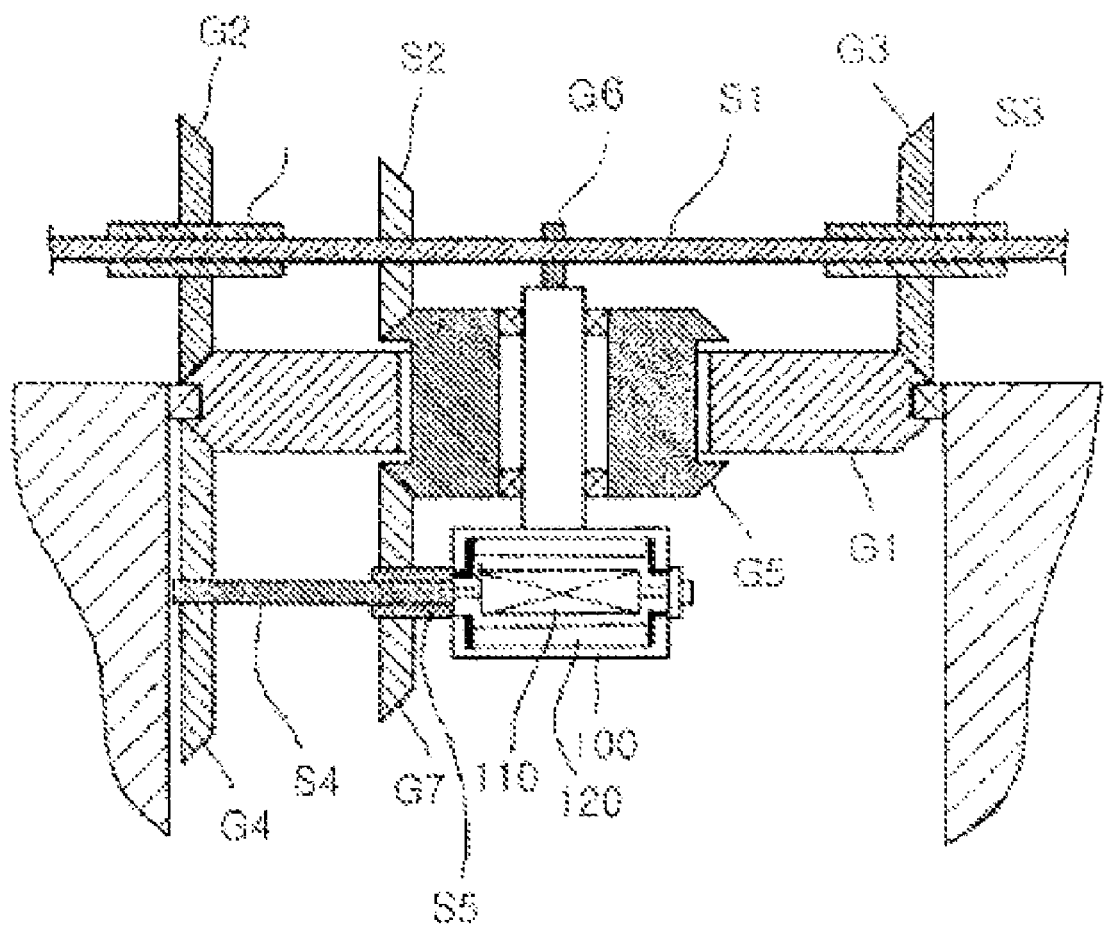
FIG. 3 is a detailed view illustrating power transmission mechanisms for transmitting rotating forces from the windmill-type electric power generation system to an electric generator

Now, a power transmission structure of the rotary blade units will be described in detail with reference to FIG. 3.

As previously described, the first and fourth rotary blade units 10 and 16 are rotated in the direction opposite to the rotating direction of the second and third rotary blade units 12 and 14. For this reason, the power transmission structure of the rotary blade units will be described based on a first power transmission mechanism and a second power transmission mechanism, into which the power transmission structure is divided.

The first power transmission mechanism serves to transmit the rotating movement of the second and third rotary blade units 12 and 14 to an armature 110 of an electric generator 100 while the second power transmission mechanism serves to transmit the rotating movement of the first and fourth rotary blade units 10 and 16 to a magnetic pole 120 of the electric generator 100, and vice versa.

The first power transmission mechanism includes a first idle gear G1 mounted to the inner wall of the supporting post 1 such that the first idle gear G1 can be rotated by a bearing, a gear G2 mounted to a rotary shaft S2 of the second rotary blade unit 12 such that the gear G2 can be rotated along with the rotary shaft S2 of the second rotary blade unit 12, the gear G2 being engaged with the first idle gear G1, a gear G3 mounted to a rotary shaft S3 of the third rotary blade unit 14 such that the gear G3 can be rotated along with the rotary shaft S3 of the third rotary blade unit 14, the gear G3 being engaged with the first idle gear G1 at the side opposite to the gear G2, a driven gear G4 engaged with the first idle gear G1 under the first idle gear G1 such that the driven gear G4 can be rotated along with the first idle gear G1, and a rotary shaft S4 mounted to the center of the driven gear G4 for transmitting the rotating movement of the driven gear G4 to the armature 110 of the electric generator 100. By the first power transmission mechanism with the above-stated construction, the rotating forces of the second and third rotary blade units are transmitted to the same first idle gear G1 via the opposite gears G2 and G3. That is, the first idle gear G1 is rotated in the same direction at the opposite sides of the first idle gear G1. Consequently, the rotating force transmission efficiency is increased.

The second power transmission mechanism includes a second idle gear G5 mounted to a supporting shaft such that the second idle gear G5 can be rotated by a bearing, the second idle gear G5 being disposed coaxially with the first idle gear G1, a gear G6 mounted to a rotary shaft S1 of the first and fourth rotary blade units 10 and 16 such that the gear G6 can be rotated along with the rotary shaft S1 of the first and fourth rotary blade units 10 and 16, the gear G6 being engaged with the second idle gear G5, a driven gear G7 engaged with the second idle gear G5 under the second idle gear G5 such that the driven gear G7 can be rotated along with the second idle gear G5, and a rotary shaft S5 mounted to the center of the driven gear G7 for transmitting the rotating movement of the driven gear G7 to the magnetic pole 120 of the electric generator 100.

For convenience of description, the bearings for rotatably supporting the above-mentioned various rotary shafts are omitted from the drawing, since the bearing structures are well known to those skilled in the art. Preferably, the above-mentioned gears are bevel gears. Also, a detailed description of the rotary structure of the armature and the magnetic pole will not be given, since the rotary structure of the armature and the magnetic pole is well known to those skilled in the art.

The armature 100 and the magnetic pole 120 of the electric generator 100 are rotated in opposite directions, by the first and second power transmission mechanism with the above-stated construction, to generate electricity.

For example, in the case of a generator that generates electricity only by the rotation of the armature, the armature is rotated 10 times per second to generate 1 kw.

In the generator according to the present invention, on the other hand, the armature is rotated 10 times per second in the clockwise direction, and the magnetic pole is rotated 10 times per second in the counterclockwise direction, thereby generating a total of 20 kw.

Consequently, the amount of electricity generated can be doubled in the same structure. Furthermore, the same amount of electricity generated can be produced by a generator having reduced capacity, and therefore, it is possible to reduce load applied to the windmill.

INDUSTRIAL APPLICABILITY

As apparent from the above description, the present invention can be appropriately used in a wind power generation application.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A windmill-type electric generation system that generates electricity by using the rotating movement of rotary blade units mounted on opposite ends of corresponding rotary shafts, which are mounted through a housing disposed at the upper end of a supporting post, such that the rotary blade units can be rotated in the blowing direction of wind, wherein the windmill-type electric generation system comprises: a first rotary blade unit mounted to the front end of the corresponding rotary shaft at one side of the housing, the first rotary blade unit having the smallest length; a second rotary blade unit mounted on the corresponding rotary shaft such that the second rotary blade unit can be rotated in the direction opposite to the rotating direction of the first rotary blade unit, the second rotary blade unit being disposed at the rear of the first rotary blade unit while being spaced a predetermined distance from the first rotary blade unit, the second rotary blade unit having a length greater than that of the first rotary blade unit; a third rotary blade unit mounted on the corresponding rotary shaft at the other side of the housing such that the third rotary blade unit can be rotated in the same rotating direction as that of the second rotary blade unit, the third rotary blade unit having a length greater than that of the second rotary blade unit; a fourth rotary blade unit mounted on the corresponding rotary shaft such that the fourth rotary blade unit can be rotated in the direction opposite to the rotating direction of the third rotary blade unit, the fourth rotary blade unit being disposed at the rear of the third rotary blade unit while being spaced a predetermined distance from the third rotary blade unit, the fourth rotary blade unit having a length greater than that of the third rotary blade unit; a first power transmission mechanism for transmitting the rotating movement of the second and third rotary blade units to an armature of an electric generator; a second power transmission mechanism for transmitting the rotating movement of the first and fourth rotary blade units to a magnetic pole of the electric generator; and the electric generator for generating electricity through the rotation of the armature and the magnetic pole in the opposite directions, which is accomplished by the rotating movement of the first to fourth rotary blade units transmitted to the armature and the magnetic pole by the first and second power transmission mechanisms.

2. The electric generation system as set forth in claim 1, wherein the first power transmission mechanism includes: a first idle gear mounted to the inner wall of the supporting post such that the first idle gear can be rotated by a bearing; a gear mounted to a rotary shaft of the second rotary blade unit such that the gear can be rotated along with the rotary shaft of the second rotary blade unit, the gear being engaged with the first idle gear; a gear mounted to a rotary shaft of the third rotary blade unit such that the gear can be rotated along with the rotary shaft of the third rotary blade unit, the gear being engaged with the first idle gear at the side opposite to the gear; a driven gear engaged with the first idle gear under the first idle gear such that the driven gear can be rotated along with the first idle gear; and a rotary shaft mounted to the center of the driven gear for transmitting the rotating movement of the driven gear to the armature of the electric generator, and the second power transmission mechanism includes: a second idle gear mounted to a supporting shaft such that the second idle gear can be rotated by a bearing, the second idle gear being disposed coaxially with the first idle gear; a gear mounted to a rotary shaft of the first and fourth rotary blade units such that the gear can be rotated along with the rotary shaft of the first and fourth rotary blade units, the gear being engaged with the second idle gear; a driven gear engaged with the second idle gear under the second idle gear such that the driven gear can be rotated along with the second idle gear; and a rotary shaft mounted to the center of the driven gear for transmitting the rotating movement of the driven gear to the magnetic pole of the electric generator, whereby the armature and the magnetic pole of the electric generator are rotated in opposite directions by the first and second power transmission mechanisms.

3. The electric generation system as set forth in claim 1, wherein the ratio of lengths of the first to fourth rotary blade units is 1:1.2:3.8:4.

4. The electric generation system as set forth in claim 3, wherein the first power transmission mechanism includes: a first idle gear mounted to the inner wall of the supporting post such that the first idle gear can be rotated by a bearing; a gear mounted to a rotary shaft of the second rotary blade unit such that the gear can be rotated along with the rotary shaft of the second rotary blade unit, the gear being engaged with the first idle gear; a gear mounted to a rotary shaft of the third rotary blade unit such that the gear can be rotated along with the rotary shaft of the third rotary blade unit, the gear being engaged with the first idle gear at the side opposite to the gear; a driven gear engaged with the first idle gear under the first idle gear such that the driven gear can be rotated along with the first idle gear; and a rotary shaft mounted to the center of the driven gear for transmitting the rotating movement of the driven gear to the armature of the electric generator, and the second power transmission mechanism includes: a second idle gear mounted to a supporting shaft such that the second idle gear can be rotated by a bearing, the second idle gear being disposed coaxially with the first idle gear; a gear mounted to a rotary shaft of the first and fourth rotary blade units such that the gear can be rotated along with the rotary shaft of the first and fourth rotary blade units, the gear being engaged with the second idle gear; a driven gear engaged with the second idle gear under the second idle gear such that the driven gear can be rotated along with the second idle gear; and a rotary shaft mounted to the center of the driven gear for transmitting the rotating movement of the driven gear to the magnetic pole of the electric generator, whereby the armature and the magnetic pole of the electric generator are rotated in opposite directions by the first and second power transmission mechanisms.

* * * * *